United States Patent
Igarashi

(10) Patent No.: US 9,624,821 B2
(45) Date of Patent: Apr. 18, 2017

(54) AIR INTAKE STRUCTURE FOR INTERNAL COMBUSTION ENGINE

(75) Inventor: Osamu Igarashi, Toyota (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 0 days.

(21) Appl. No.: 14/110,862

(22) PCT Filed: May 19, 2011

(86) PCT No.: PCT/JP2011/061536
§ 371 (c)(1),
(2), (4) Date: Oct. 9, 2013

(87) PCT Pub. No.: WO2012/157113
PCT Pub. Date: Nov. 22, 2012

(65) Prior Publication Data
US 2014/0116403 A1 May 1, 2014

(51) Int. Cl.
| F02M 25/06 | (2016.01) |
| F02B 33/02 | (2006.01) |
| F02B 39/16 | (2006.01) |
| F02M 35/10 | (2006.01) |
| F01M 13/02 | (2006.01) |

(Continued)

(52) U.S. Cl.
CPC ........... *F02B 33/02* (2013.01); *F01M 13/022* (2013.01); *F02B 39/16* (2013.01); *F02M 25/06* (2013.01); *F02M 35/088* (2013.01); *F02M 35/10157* (2013.01); *F02M 35/10222* (2013.01); *F02M 35/10262* (2013.01); *F01M 2013/027* (2013.01); *F02B 37/00* (2013.01); *F02M 35/0216* (2013.01); *F02M 35/046* (2013.01);

(Continued)

(58) Field of Classification Search
CPC ................... F02M 25/06; F01M 13/04; F01M 2013/0455; F01M 13/022; F01M 2013/0027
USPC .................................................. 123/572–574
See application file for complete search history.

(56) References Cited

U.S. PATENT DOCUMENTS 3,326,198 A * 6/1967 Jackson ................. F01M 13/04
123/572
5,488,939 A * 2/1996 Nakai et al. .................. 123/572
(Continued)

FOREIGN PATENT DOCUMENTS

| DE | 4118265 A1 | 12/1991 |
| EP | 1 893 850 B1 | 10/2009 |

(Continued)

*Primary Examiner* — Marguerite McMahon
(74) *Attorney, Agent, or Firm* — Sughrue Mion, PLLC

(57) ABSTRACT

Problem
In an air intake structure for an internal combustion engine 1 where a compressor impeller 22 of a turbocharger 20 is disposed in an air intake passage (4) of the internal combustion engine 1, not to prevent an ice clump 15 from appearing on an inner wall surface of the air intake passage (4), but prevents this ice clump 15 from colliding with the compressor impeller 22, especially, a vane 22a of the compressor impeller 22 when the ice clump 15 formed on the inner wall surface of the air intake passage (4) peels off.
Solution
A capture member 30 is provided upstream side with respect to the compressor impeller 22 in the air intake passage (4). The capture member 30 is configured to capture an ice clump 15 formed at an inner wall surface of the air intake passage (4) when the ice clump 15 peels off.

6 Claims, 8 Drawing Sheets

(51) Int. Cl.
*F02M 35/08* (2006.01)
*F02B 37/00* (2006.01)
*F02M 35/02* (2006.01)
*F02M 35/04* (2006.01)

(52) U.S. Cl.
CPC ............ *Y02T 10/121* (2013.01); *Y02T 10/144* (2013.01); *Y02T 10/146* (2013.01)

(56) References Cited

U.S. PATENT DOCUMENTS

| | | | |
|---|---|---|---|
| 6,123,061 A * | 9/2000 | Baker et al. | 123/573 |
| 6,354,283 B1 * | 3/2002 | Hawkins et al. | 123/572 |
| 6,505,615 B2 * | 1/2003 | Pietschner | 123/572 |
| 7,168,421 B2 * | 1/2007 | Blom | 123/573 |
| 2001/0022175 A1 * | 9/2001 | Moren | 123/572 |
| 2001/0047801 A1 * | 12/2001 | Baeuerle et al. | 123/574 |
| 2002/0134361 A1 * | 9/2002 | Okamoto | 123/572 |
| 2005/0241310 A1 | 11/2005 | Blom | |
| 2008/0314351 A1 | 12/2008 | Ryrholm et al. | |
| 2010/0186686 A1 * | 7/2010 | Cattani et al. | 123/41.44 |
| 2011/0056455 A1 * | 3/2011 | Koyamaishi et al. | 123/196 A |
| 2011/0197864 A1 * | 8/2011 | Karcher | 123/574 |
| 2012/0199104 A1 * | 8/2012 | Vogl | 123/572 |
| 2014/0048052 A1 * | 2/2014 | Subedi et al. | 123/572 |

FOREIGN PATENT DOCUMENTS

| | | |
|---|---|---|
| JP | 2008-255960 A | 10/2008 |
| JP | 2008-544142 A | 12/2008 |
| JP | 2009-281317 A | 12/2009 |
| JP | 2010-077833 A | 4/2010 |
| JP | 2010-216376 A | 9/2010 |
| JP | 2010-255545 A | 11/2010 |
| WO | 8402955 A1 | 8/1984 |
| WO | 2006/135327 A1 | 12/2006 |

* cited by examiner

AIR INTAKE STRUCTURE FOR INTERNAL COMBUSTION ENGINE

CROSS REFERENCE TO RELATED APPLICATIONS

This application is a National Stage of International Application No. PCT/JP2011/061536 filed May 19, 2011, the contents of all of which are incorporated herein by reference in their entirety.

TECHNICAL FIELD

The present invention relates to an air intake structure for an internal combustion engine where a compressor impeller of a turbocharger is disposed at an air intake passage of the internal combustion engine.

BACKGROUND ART

In an internal combustion engine (engine) mounted to a vehicle, for example, unburned air-fuel mixture and a burned combustion gas may leak from an combustion chamber into a crankcase through a gap between a cylinder and a piston.

When the combustion gas mixes with engine oil in the crankcase, the engine oil is degraded. To prevent the degrade of this engine oil, the engine is equipped with a blow-by gas reducing device of Positive Crankcase Ventilation (PCV) system that ventilates the inside of the crankcase.

In the engine including the blow-by gas reducing device, after a blow-by gas in the crankcase is separated into vapor and liquid through an oil separator, the blow-by gas is recirculated to an air intake pipe through a PCV valve (flow control valve) and a PCV hose (blow-by gas passage). The PCV hose is coupled to the air intake pipe at one end portion.

In situations where, for example, an intake air temperature is low, such as during idling of the engine with a low outside temperature, moisture included in the blow-by gas may freeze near the coupling portion of the PCV hose at an inner wall surface of the air intake pipe. This frozen moisture may grow into a large ice clump.

If such ice clump peels off and is transported to the downstream side of the air intake pipe by an intake airflow, the ice clump may collide with the compressor impeller of the turbocharger disposed downstream side of the air intake pipe. Especially, it is not preferred that a large ice clump collide with a thin-walled vane formed at the compressor impeller.

In contrast to this, the applicant of this application, for example, has proposed a technique described in Patent Literature 1. In this Patent Literature 1, forming a plurality of depressed portions in sections on the inner wall surface of the air intake pipe prevents a large ice clump from appearing on the inner wall surface of the air intake pipe.

CITATION LIST

Patent Literature

PATENT LITERATURE 1: Japanese Unexamined Patent Application Publication No. 2009-281317

SUMMARY OF INVENTION

Technical Problem

The conventional example according to the above-described Patent Literature 1 is a technique that prevents a large ice clump from appearing on an inner wall surface of an air intake pipe. This allows the large ice clump not to collide with a compressor impeller of a supercharger, especially, a vane of the compressor impeller.

In contrast to this, the present invention does not aim to prevent an ice clump from appearing on an inner wall surface of an air intake passage in an air intake structure for an internal combustion engine where a compressor impeller of a turbocharger is disposed in an air intake passage of the internal combustion engine, but aims to prevent an ice clump from colliding with the compressor impeller when the ice clump appearing on the inner wall surface of the air intake passage peels off.

Solutions to the Problems

The present invention is an air intake structure for an internal combustion engine that includes a compressor impeller of a turbocharger and a capture member. The compressor impeller of the turbocharger is provided in an air intake passage of the internal combustion engine. The capture member is provided upstream side with respect to the compressor impeller in the air intake passage. The capture member is configured to capture an ice clump formed at an inner wall surface of the air intake passage when the ice clump peels off.

In this case, even if moisture in the air intake passage freezes to the inner wall surface of the air intake passage, grows to a large ice clump, and then the ice clump peels off, since the ice clump is captured by the capture member, the ice clump cannot reach the compressor impeller installed at the downstream side of the air intake passage with respect to the capture member in the intake airflow direction.

This allows preventing the ice clump from colliding with the compressor impeller installed at the downstream side of the air intake passage with respect to the capture member in the intake airflow direction. Accordingly, this avoids a negative effect on rotation performance of the compressor impeller over the long term.

Preferably, a blow-by gas passage may be coupled to the air intake passage at an upstream side with respect to the capture member and is configured to introduce a blow-by gas in a crankcase of the internal combustion engine.

Here, the blow-by gas is specified as a factor that makes the ice clump. Accordingly, it is obvious that if an intake air temperature in the air intake passage is low, moisture included in the blow-by gas introduced from the crankcase to the air intake passage through a blow-by gas passage freezes near the coupling portion with blow-by gas passage at the air intake passage.

Preferably, the capture member may be configured as a filter that allows air sucked in the air intake passage to pass through and prevents the ice clump from passing through. The capture member is provided so as to extend radially inward from an inner wall surface of the air intake passage. The capture member is an annual member including a hole at a center portion of the air intake passage. The hole passes through in a center axis direction. The hole includes a peripheral edge that projects toward an upstream side in an intake airflow direction.

In this configuration, the capture member is not installed in the entire region radially in the middle of the air intake passage, and the capture member is an annual member extending radially inward from the inner wall surface of the air intake passage. That is, since the center portion of the capture member is open, an intake air resistance in the air intake passage is reduced compared with the case where the center portion is not open. Thus, the pressure loss of the intake air is reduced.

Moreover, even if a hole is disposed at the center portion of the capture member, the ice clump is less likely to pass through the hole. This is because, in the case where the compressor impeller of the turbocharger is disposed at the air intake passage, swirl flow is generated along the inner peripheral surface of the air intake passage in association with the rotation of the compressor impeller. That is, when the ice clump that peels off is transported to the upstream side of the capture member by an intake airflow, the ice clump goes through the inner peripheral surface of the air intake passage and contacts the outer peripheral portion of one side surface of the capture member (surface at the upstream side in the intake airflow direction) by the swirl flow and is stopped. Meanwhile, the intake airflow passes through the inside of the capture member formed of a filter.

Furthermore, since the peripheral edge of a circular hole projects toward the upstream side in the intake airflow direction, the ice clump captured by the capture member is prevented from going beyond the capture member from the circular hole of the capture member to the downstream side. This reduces a possibility for the ice clump to pass through the capture member.

Preferably, the capture member may be configured as a filter that allows air sucked in the air intake passage to pass through and prevents the ice clump from passing through. The capture member is provided so as to extend radially inward from an inner wall surface of the air intake passage.

In this configuration, the capture member is not installed in the entire region radially in the middle of the air intake passage, and the capture member extends radially inward from the inner wall surface of the air intake passage. That is, since the center portion of the capture member is open, an intake air resistance in the air intake passage is reduced compared with the case where the center portion is not open. Thus, the pressure loss of the intake air is reduced.

Moreover, even if the center portion of the capture member is open, the ice clump is less likely to pass through the open part. This is because, in the case where the compressor impeller of the turbocharger is disposed at the air intake passage, swirl flow is generated along the inner peripheral surface of the air intake passage in association with the rotation of the compressor impeller. That is, when the ice clump that peels off is transported to the upstream side of the capture member by an intake airflow, the ice clump goes through the inner peripheral surface of the air intake passage and contacts the outer peripheral portion of one side surface of the capture member (surface at the upstream side in the intake airflow direction) by the swirl flow and is stopped. Meanwhile, the intake airflow passes through the inside of the capture member forming a filter.

Advantageous Effects of Invention

The present invention does not prevent an ice clump from appearing on an inner wall surface of an air intake passage in an air intake structure for an internal combustion engine where a compressor impeller of a turbocharger is disposed in the air intake passage of the internal combustion engine, but prevents this ice clump from colliding with a compressor impeller, especially, a vane of the compressor impeller when an ice clump appearing on the inner wall surface of the air intake passage peels off. This allows protecting the compressor impeller, thus achieving stable functionality of the turbocharger itself over the long term.

DESCRIPTION OF EMBODIMENTS

Figure 1:
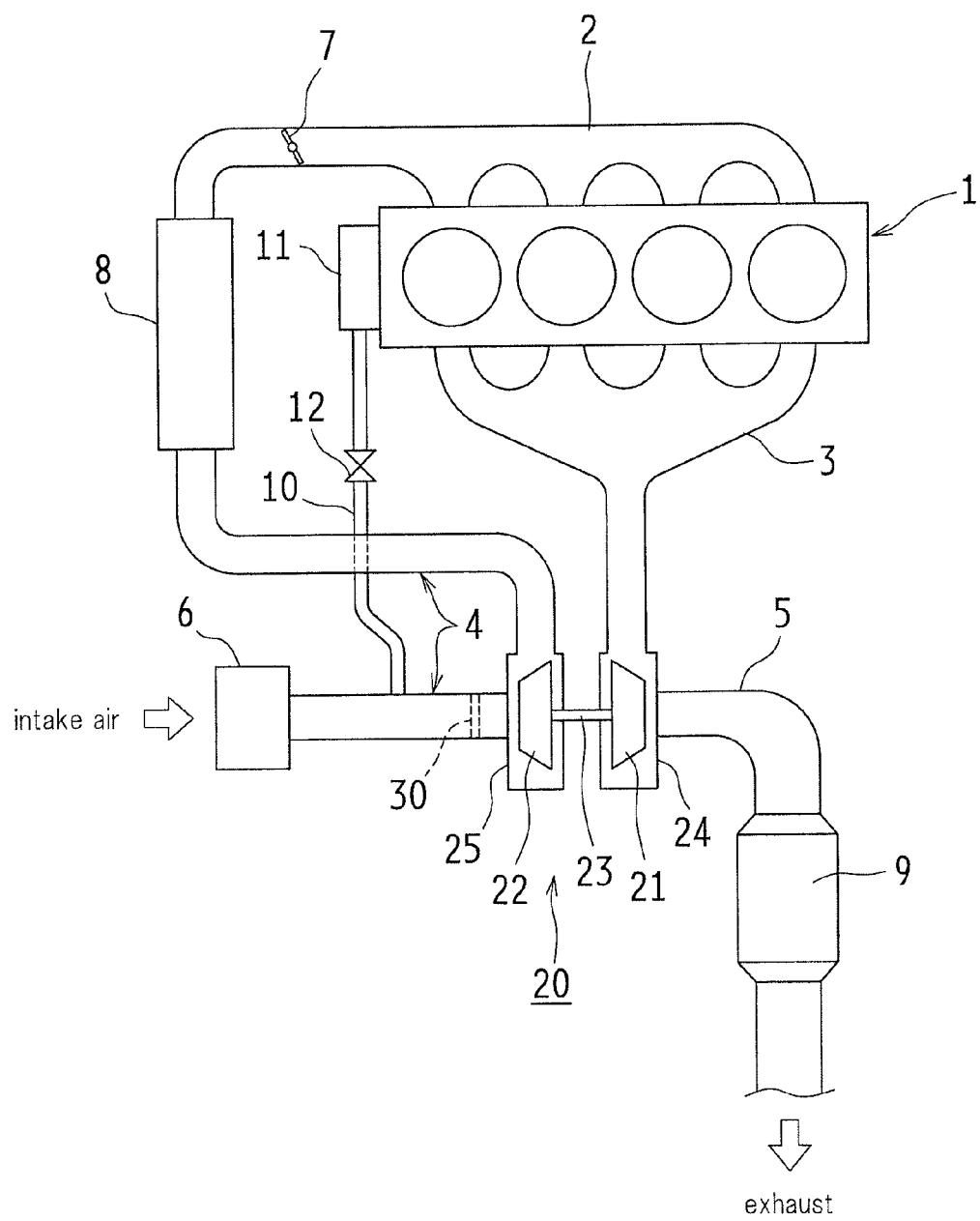
FIG. 1 is a schematic configuration view illustrating one embodiment of an internal combustion engine according to the present invention.

A best mode for carrying out the present invention will be described in detail by referring to the drawings.

Figure 2:
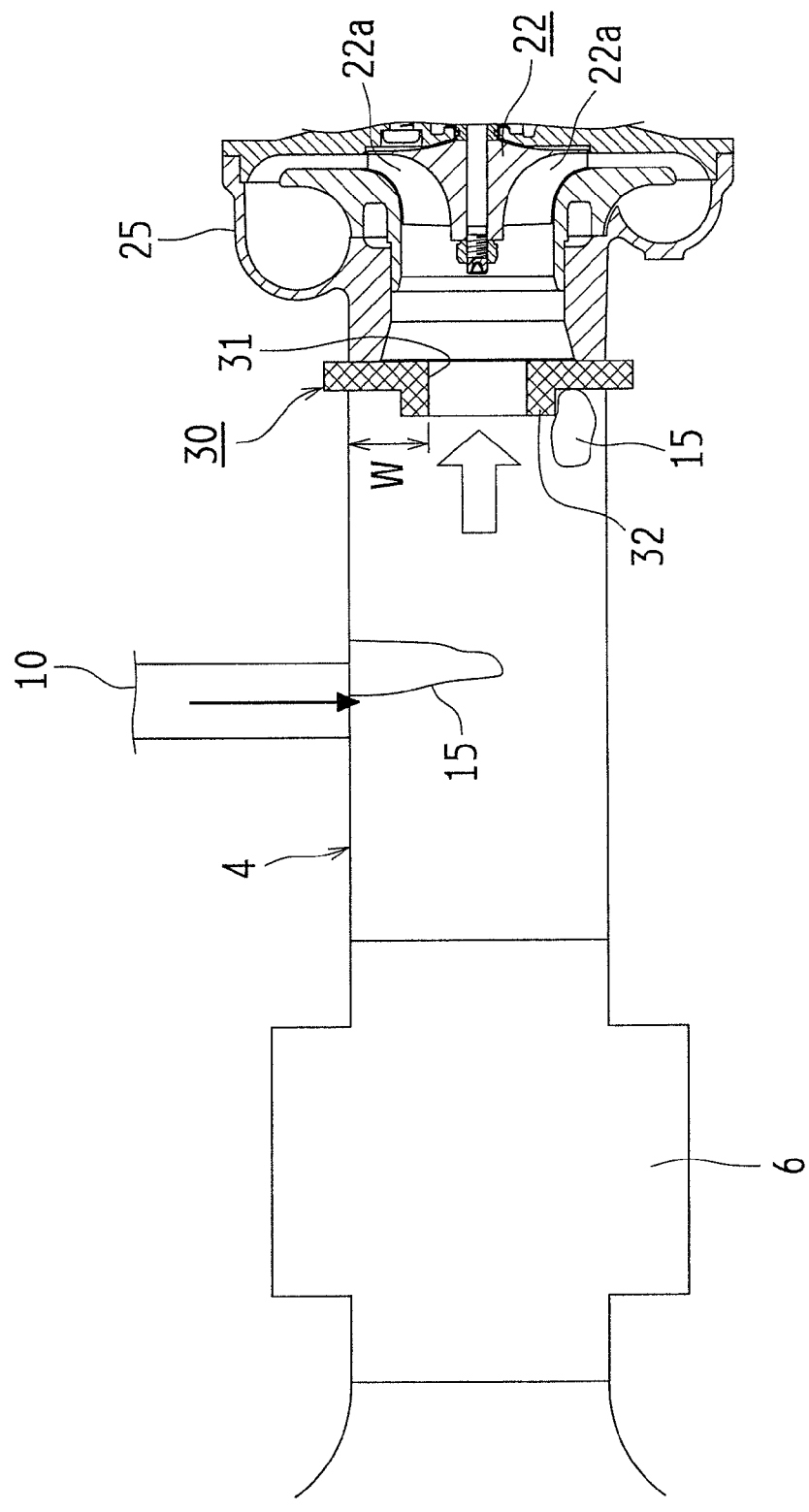
FIG. 2 is a cross-sectional view illustrating one embodiment of an air intake structure of FIG. 1.
Figure 3:
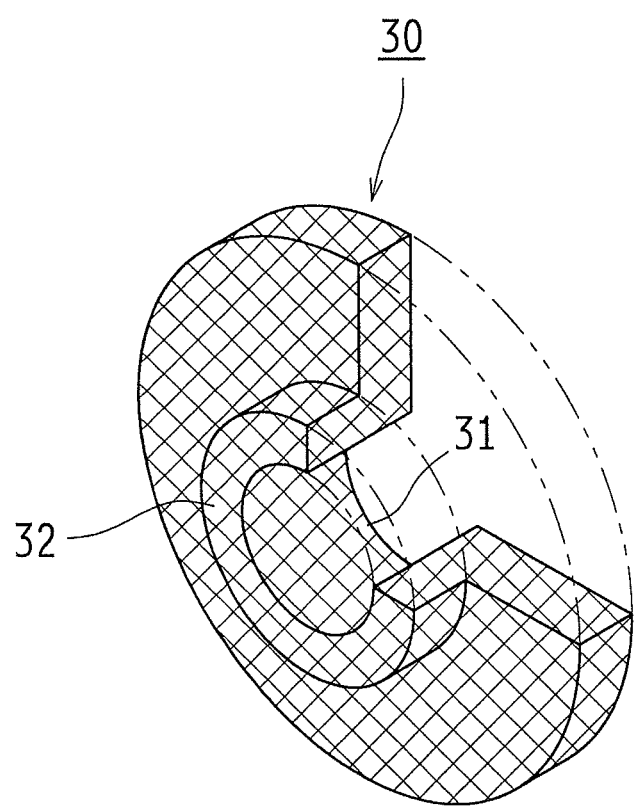
FIG. 3 is a perspective view of a capture member of FIG. 2.

FIG. 1 to FIG. 3 illustrate one embodiment according to the present invention. An exemplary engine 1 illustrated in this embodiment is, for example, an inline four-engine. A cylinder head (not shown) of the engine 1 includes an intake manifold 2 and an exhaust manifold 3. The intake manifold 2 distributes and supplies an incoming air to respective cylinders. The exhaust manifold 3 collects exhaust gas discharged from the respective cylinders.

An air intake pipe 4 to take air from the atmosphere is coupled to the intake manifold 2. This air intake pipe 4 includes an air cleaner 6 at the inlet. The intake manifold 2 and the air intake pipe 4 constitute an air intake passage.

The intake manifold 2 includes a throttle valve 7 to adjust the incoming air quantity of the engine 1 at the upstream side in the intake airflow direction. Although not shown, this throttle valve 7 is actuated by a throttle motor and an Electronic Control Unit (ECU).

Meanwhile, an exhaust pipe 5 is coupled to the exhaust manifold 3. A catalyst 9 to purify an exhaust gas is installed at the downstream side of the exhaust pipe 5. The exhaust manifold 3 and the exhaust pipe 5 constitute a part of the exhaust passage.

The engine 1 according to this embodiment is equipped with a turbocharger 20. This turbocharger 20 is to supercharge the incoming air into the engine 1 using exhaust pressure. This turbocharger 20 includes a turbine wheel 21 and a compressor impeller 22, or similar member.

The turbine wheel 21 is disposed inside of a turbine housing 24, which is disposed between the exhaust manifold 3 and the exhaust pipe 5 (in the middle of the exhaust passage). The compressor impeller 22 is disposed in a compressor housing 25, which is disposed in the middle of the air intake pipe 4. The compressor impeller 22 is mounted to a turbine shaft 23, which is integrally with the turbine wheel 21. This integrally rotates the turbine wheel 21 and the compressor impeller 22.

As an operation of the turbocharger 20, the turbine wheel 21 is rotated by an energy of an exhaust gas discharged from the engine 1 and the compressor impeller 22 is rotated integrally with this rotation. Accordingly, an air sucked into the air intake pipe 4 is supercharged and is forcibly sent to a combustion chamber in each cylinder of the engine 1. The air supercharged by this compressor impeller 22 is cooled by an intercooler 8. The intercooler 8 is installed at the air intake pipe 4 downstream side with respect to the compressor impeller 22 in the intake airflow direction.

Furthermore, this engine 1 is equipped with a blow-by gas reducing device of Positive Crankcase Ventilation (PCV) system (reference numeral omitted). This blow-by gas reducing device, although not illustrated, includes a ventilation passage (illustration omitted) that flows air in the cylinder head cover into a crankcase. Airflow is generated in the crankcase via the ventilation passage. By this intake airflow, the blow-by gas in the crankcase is introduced to a region downstream side in the air intake pipe 4 with respect to the air cleaner 6 and upstream side in the air intake pipe 4 with respect to the compressor impeller 22 of the turbocharger 20 via a blow-by gas passage (for example, a PCV hose) 10.

Then, the blow-by gas reducing device according to this embodiment includes an oil separator (also referred to as a gas-liquid separation chamber) 11, which separates an oil in the blow-by gas to prevent an oil mixed in the blow-by gas in the crankcase from entering the air intake pipe 4, and a flow control valve (for example, a PCV valve) 12 to adjust a blow-by gas introduction quantity to the air intake pipe 4 corresponding to an intake air negative pressure.

The oil separator 11 is interposed at a communicating and coupling portion where a crankcase (illustration omitted) is coupled to and communicates with the blow-by gas passage 10. The oil separator 11 is disposed outside or inside of the engine 1. Further, the flow control valve 12 is installed in the middle of the blow-by gas passage 10.

Thus, the blow-by gas reducing device has a configuration that includes the ventilation passage (not shown), the blow-by gas passage 10, the oil separator 11, the flow control valve 12, and similar member.

In the case where such blow-by gas reducing device is equipped, an ice clump 15 is possibly formed near the coupling portion of the blow-by gas passage 10 at the air intake pipe 4. Specifically, although described in the conventional example, for example, when an intake air temperature is low, such as during an idling of the engine 1 with a low outside temperature, moisture included in the blow-by gas may freeze near the coupling portion of the blow-by gas passage 10 at the inner wall surface of the air intake pipe 4. This moisture may grow to the large ice clump 15. If such large ice clump 15 peels off and is transported to the downstream side of the air intake pipe 4 by an intake airflow, the ice clump 15 may collide with the compressor impeller 22 of the turbocharger 20, especially, a vane 22$a$ of the compressor impeller 22.

Therefore, in this embodiment, a capture member 30 to capture the ice clump 15 is disposed in a region from the air cleaner 6 to the compressor housing 25 of the turbocharger 20 at the air intake pipe 4. In this embodiment, the region has a linear shape and is disposed laterally.

In this embodiment, the capture member 30 is a filter that captures the ice clump 15 equal to or more than the predetermined size and allows the air sucked in the air intake pipe 4 to pass.

The capture member 30 formed of this filter, for example, is a meshed plate or a meshed sheet, a large number of lamination of the meshed plates or meshed sheets, a plate-shaped matter where a fiber is tangled in a cotton state, or similar. The sheet, the plate, and the fiber are preferred to be formed by a material such as a resin due to the following concerns. If the ice clump 15 or moisture contacts the sheet, the plate, or the fiber formed by a metallic material, the sheet, the plate, or the fiber is easily freezes and easily causes clogging. That is, if the capture member 30 is made of resin as described above, compared with the case where the capture member 30 is made of metal as described above, coefficient of thermal conductivity is low and the capture member 30 is less likely to cool, thus the clogging is less likely to occur.

In detail, the filtration capability (or a mesh size) of the capture member 30 formed of this filter is specified as follows. That is, assuming that the ice clump 15 becomes gradually small with being captured by the capture member 30 and then passes through inside of the capture member 30. It is preferred to specify the size of the ice clump 15 where the ice clump 15 can pass through the inside of the capture member 30, that is, the filtration capability of the capture member 30 so as to avoid providing a negative effect to rotation performance of the compressor impeller 22 even if the passed-through ice clump 15 collides with the compressor impeller 22 of the turbocharger 20, especially, the vane 22$a$ of the compressor impeller 22. Incidentally, as one exemplary size of the ice clump 15 that can pass through the inside of the capture member 30 may be specified as less than 10 mm×10 mm.

Then, this capture member 30 is formed in a circular plate shape. The capture member 30 includes a circular hole 31 that passes through in a center axis direction (plate thickness direction) at the center portion. The peripheral edge of the circular hole 31 projects toward the upstream side of the intake airflow direction. This projecting portion is referred to as an annular portion 32.

The following describes a reason that the circular hole 31 is thus disposed at the center portion of the capture member 30. First, this is because to reduce intake air resistance and to reduce pressure loss of the intake air by preventing clogging. Additionally, the following points are further considered.

That is, originally, at the upstream side of the compressor impeller 22 of the turbocharger 20 in the air intake pipe 4, intake airflow rotates along the inner peripheral surface of the air intake pipe 4 by rotation of the compressor impeller 22 to flow. Therefore, the inventor of this application has perceived that, for example, if the ice clump 15 is formed near the coupling portion of the blow-by gas passage 10 at the air intake pipe 4 and the ice clump 15 peels off, the ice clump 15 goes along the inner peripheral surface of the air intake pipe 4 and then is transported to the downstream side. However, if the ice clump 15 is large, the ice clump 15 goes through a lower region in the vertical direction in the inner peripheral surface of the air intake pipe 4 and is transported to the downstream side. Focusing on the transport form of such ice clump 15, the center portion of the capture member 30 is not necessary to be present to reliably capture the ice clump 15. Therefore, the capture member 30 is specified as the above-described annular member.

Incidentally, a radial dimension W (see FIG. 2) at the annular-shaped portion of the capture member 30 including the circular hole 31 is preferred to be specified by the following viewpoints. The radial dimension W is, as specifically illustrated in FIG. 2, a dimension from the peripheral edge of the circular hole 31 of the capture member 30 to a position corresponding to the inner peripheral surface of the air intake pipe 4. Here, as illustrated in FIG. 2, when the downstream side of the air intake pipe 4 is viewed from a position upstream side with respect to the capture member 30 in the intake airflow direction, the radial dimension W at the annular-shaped portion of the capture member 30 can be specified such that the annular-shaped portion of the capture member 30 covers the vane 22a of the compressor impeller 22. By thus specifying, even if the ice clump 15 passes through the circular hole 31 of the capture member 30, the ice clump 15 collides with the center portion of the rotation of the compressor impeller 22, which is a comparatively strong portion. This avoids a negative effect on rotation performance of the compressor impeller 22.

The reason for disposing the annular portion 32 at the capture member 30 is as follows. When the ice clump 15 contacts one side surface of the capture member 30 (surface at the upstream side in the intake airflow direction) and the ice clump 15 is stopped, the annular portion 32 prevents the ice clump 15 from going beyond the capture member 30 from the circular hole 31 to the downstream side.

Next, the following describes an action when such capture member 30 is installed.

For example, moisture included in the blow-by gas may freeze near the coupling portion of the blow-by gas passage 10 at the inner wall surface of the air intake pipe 4 and grow to the large ice clump 15. If the ice clump 15 peels off, the ice clump 15 is transported to the downstream side of the air intake pipe 4 by an aerial flow sucked in the air intake pipe 4.

The ice clump 15 thus transported goes through a lower region in the vertical direction in the inner peripheral surface of the air intake pipe 4 and travels to one side surface of the capture member 30 (surface at the upstream side in the intake airflow direction) by swirl flow generated in accordance with the rotation of the compressor impeller 22 of the turbocharger 20. Finally, the ice clump 15 contacts the one side surface of the capture member 30 and then is stopped. This state is a captured state of the ice clump 15. The annular portion 32 of the capture member 30 prevents the ice clump 15 thus captured from going beyond the capture member 30 from the circular hole 31 to the downstream side.

Assuming that the ice clump 15 captured as described above becomes gradually small over time and then passes through the inside of the capture member 30, which serves as a filter, the possibility for the ice clump 15 to collide with the compressor impeller 22 of the turbocharger 20, especially, the vane 22a of the compressor impeller 22, increases. However, since the ice clump 15 becomes small as described above, even if the small ice clump 15 collides with the compressor impeller 22, especially, the vane 22a of the compressor impeller 22, it does not provide a negative effect on the rotation performance of the compressor impeller 22.

As described above, in the embodiment applying the present invention, even if the moisture included in the blow-by gas freezes near the coupling portion of the blow-by gas passage 10 at the inner wall surface of the air intake pipe 4 and grows to the large ice clump 15, and the ice clump 15 peels off, the ice clump 15 is prevented from colliding with the compressor impeller 22 of the turbocharger 20, especially, the vane 22a of the compressor impeller 22. This allows protecting the compressor impeller 22 of the turbocharger 20, thus achieving stable functionality of the turbocharger 20 itself for a long period.

The present invention is not limited to the above-described embodiments only. All variations and modifications falling within the equivalency range of the appended claims are intended to be embraced therein.

(1) While in the above-described embodiments, it is exemplarily described that the cause of the ice clump 15 is moisture included in the blow-by gas, the present invention is not limited to this. For example, when the ice clump 15 is formed at the inner wall surface of the air intake pipe 4 by a factor other than blow-by gas, insofar as the air intake structure includes the capture member 30 according to the present invention, the ice clump 15 formed at the inner wall surface of the air intake pipe 4 is prevented from colliding with the compressor impeller 22 of the turbocharger 20, especially, the vane 22a of the compressor impeller 22, basically similarly to the above-described embodiments.

Figure 4:
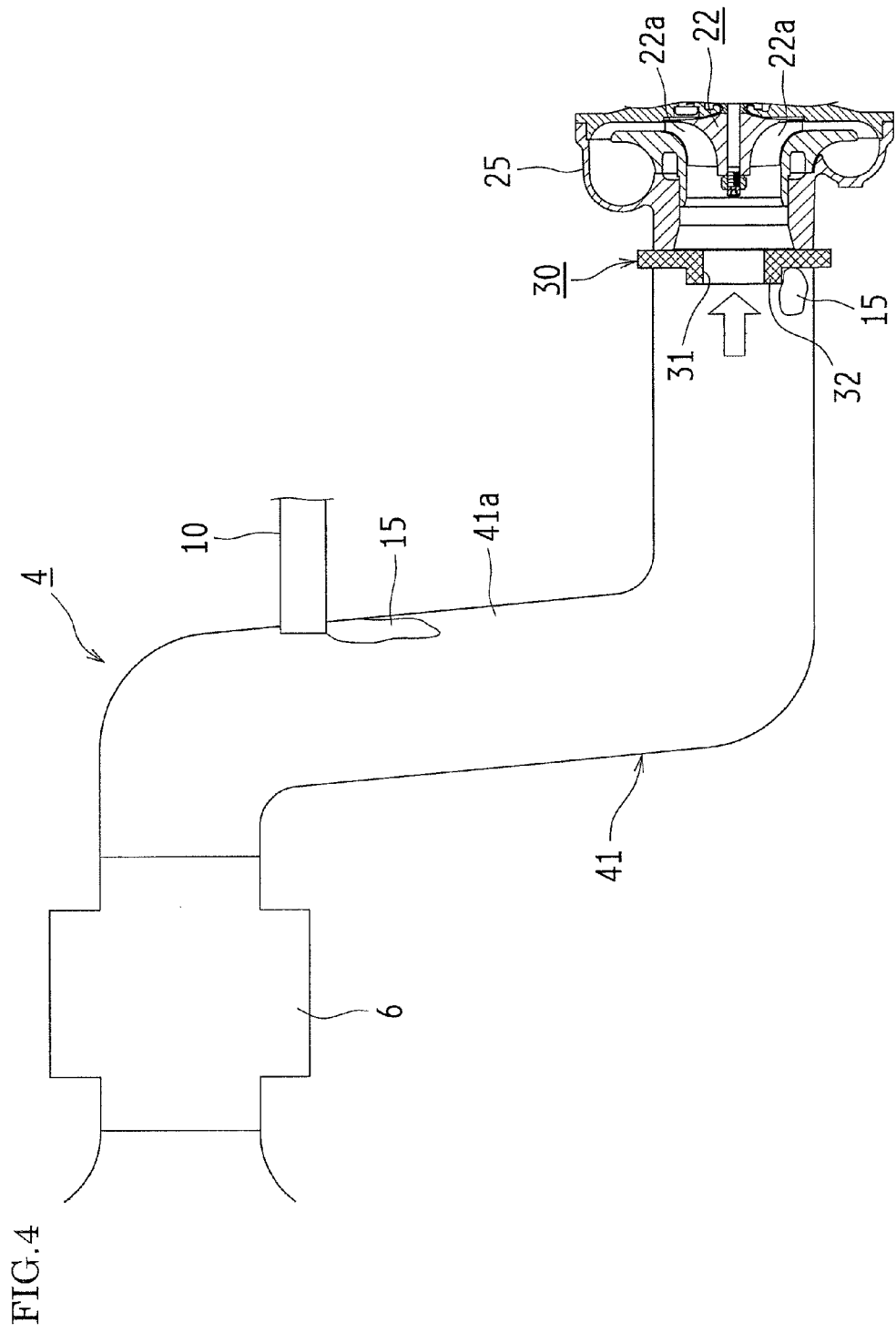
FIG. 4 is a schematic configuration view illustrating another embodiment of the internal combustion engine according to the present invention.

(2) FIG. 4 illustrates another embodiment of the air intake structure according to the present invention. The air intake structure according to this embodiment includes a region 41 cranked from the air cleaner 6 to the compressor impeller 22 of the turbocharger 20 at the air intake pipe 4. The region 41 includes a linear portion 41a disposed in the middle of the region 41 in the intake airflow direction. The blow-by gas passage 10 of the blow-by gas reducing device is coupled to the linear portion 41a.

In this case, moisture included in the blow-by gas freezes at the coupling portion of the blow-by gas passage 10 at the linear portion 41a of the region 41 of the air intake pipe 4, thus making the ice clump 15. Even in this embodiment, an action and an effect basically similar to the above-described embodiments are obtained.

Figure 5:
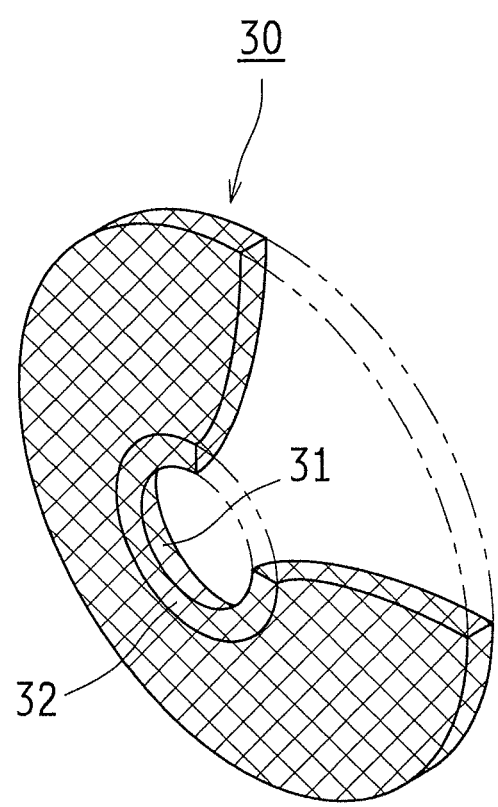
FIG. 5 is a perspective view illustrating another embodiment of the capture member of FIG. 2.

(3) FIG. 5 illustrates another embodiment of the capture member 30. The capture member 30 according to this embodiment has a diaphragm-shaped outline. Specifically, the capture member 30 is formed in a circular plate shape. The capture member 30 includes the circular hole 31 at the center portion. The peripheral edge of the circular hole 31 gradually projects toward the upstream side of the intake airflow direction. This projecting portion is referred to as the annular portion 32. This projected form curves the annular portion of the capture member 30. Even the capture member 30 achieves an action and an effect similar to the embodiments illustrated in FIG. 1 to FIG. 3.

Figure 6:
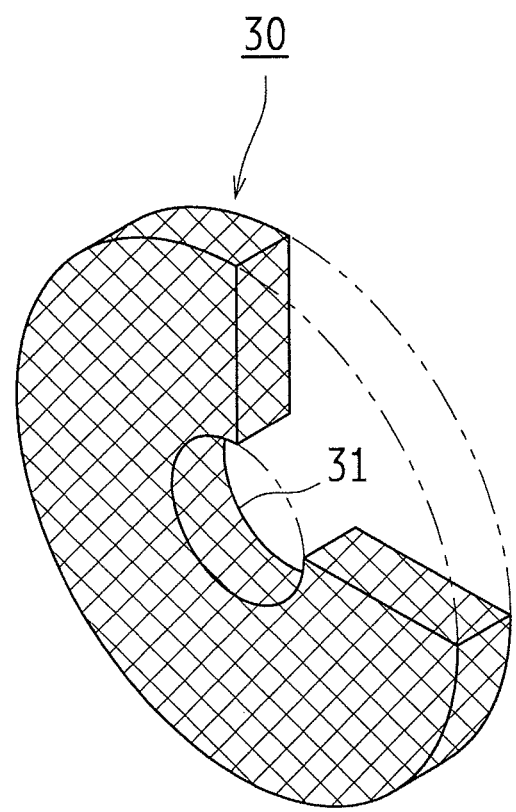
FIG. 6 is a perspective view illustrating further another embodiment of the capture member of FIG. 2.

(4) FIG. 6 illustrates another embodiment of the capture member 30. The capture member 30 according to this embodiment has a shape that lacks the annular portion 32 of the capture member 30 according to the embodiment illustrated in FIG. 3. Even this capture member 30 allows capturing the ice clump 15 basically similar to the embodiments illustrated in FIG. 1 to FIG. 3.

Figure 7:
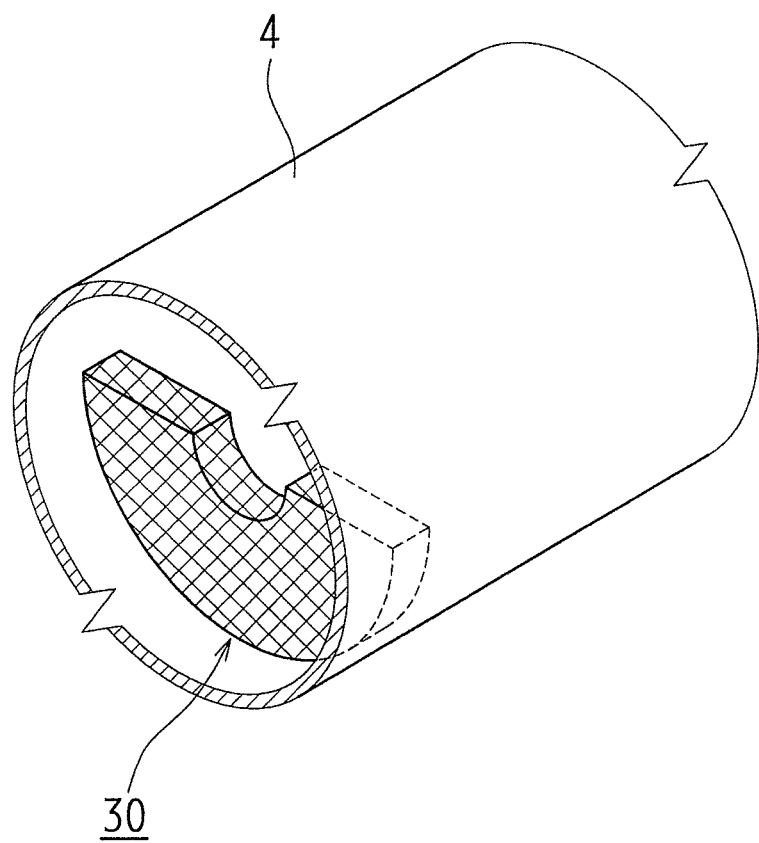
FIG. 7 is a perspective view illustrating further another embodiment of the capture member of FIG. 2.

(5) FIG. 7 illustrates another embodiment of the capture member 30. The capture member 30 according to this embodiment has a shape that is a half of the capture member 30 according to the embodiment illustrated in FIG. 3. The capture member 30 is, as illustrated in FIG. 7, installed at the lower half region in the vertical direction in the linear air intake pipe 4 disposed laterally.

Originally, when the ice clump 15 formed at the air intake pipe 4 peels off and transported to the downstream side by the intake airflow, the ice clump 15 is transported to the downstream side in a state fallen to the lower region in the vertical direction in the inner peripheral surface of the air intake pipe 4 by being pushed by the intake airflow. Furthermore, the ice clump 15 goes through the lower region in the vertical direction in the inner peripheral surface of the air intake pipe 4 and travels to the one side surface of the capture member 30 (surface at the upstream side in the intake airflow direction) by swirl flow generated by the rotation of the compressor impeller 22 of the turbocharger 20. Accordingly, the capture member 30 is not disposed at the entire circumference of the inner peripheral of the air intake pipe 4, and the capture member 30 as described above is disposed at the lower half region in the vertical direction in the air intake pipe 4. Even the capture member 30 with this shape allows capturing the ice clump 15 formed in the air intake pipe 4.

Figure 8:
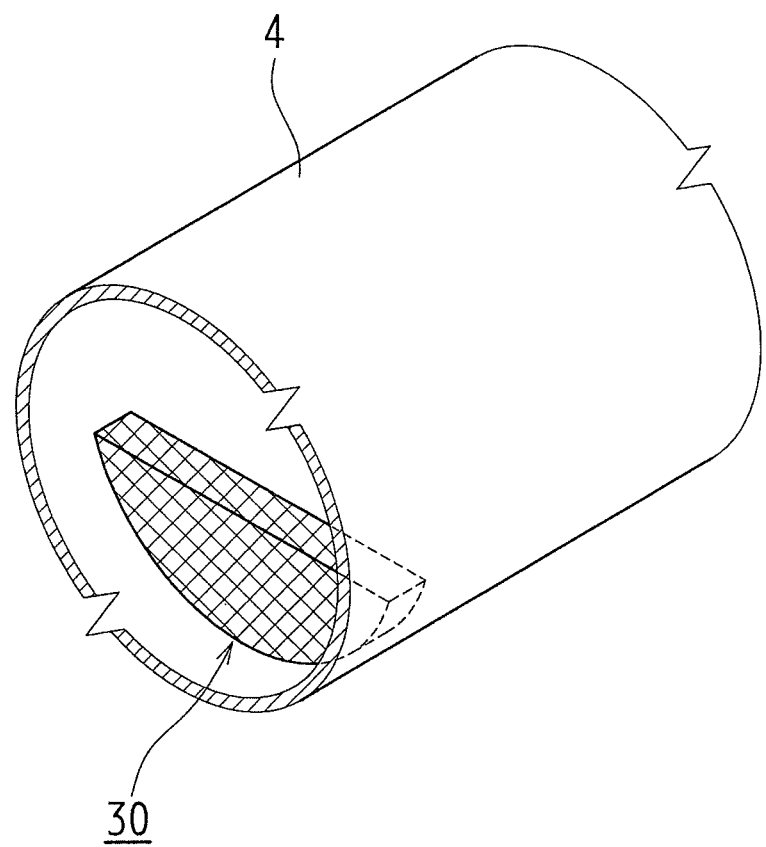
FIG. 8 is a perspective view illustrating further another embodiment of the capture member of FIG. 2.

(6) FIG. 8 illustrates another embodiment of the capture member 30. The capture member 30 according to this embodiment has an approximately two-thirds size of the capture member 30 according to the embodiment illustrated in FIG. 3. The capture member 30 is, as illustrated in FIG. 8, installed at the lower region in the vertical direction in the linear air intake pipe 4 disposed laterally.

Originally, when the ice clump 15 formed at the air intake pipe 4 peels off, the ice clump 15 goes through the lower region in the vertical direction in the inner peripheral surface of the air intake pipe 4 and contacts the one side surface of the capture member 30 (surface at the upstream side in the intake airflow direction) by swirl flow generated by the rotation of the compressor impeller 22 of the turbocharger 20, and is stopped. If the ice clump 15 is large, most of the ice clump 15 goes through the lower region in the vertical direction in the inner peripheral surface of the air intake pipe 4 and is transported by its own weight. Accordingly, the capture member 30 is not disposed at the entire circumference of the inner peripheral of the air intake pipe 4, and the capture member 30 as described above is disposed at the lower region in the vertical direction in the air intake pipe 4. Even the capture member 30 with this shape allows fully capturing the ice clump 15 formed in the air intake pipe 4.

INDUSTRIAL APPLICABILITY

The present invention is preferably applicable to an air intake structure for an internal combustion engine 1 that includes a compressor impeller 22 of a turbocharger 20 at an air intake passage (4) of the internal combustion engine 1.

DESCRIPTION OF REFERENCE SIGNS 1 engine
4 air intake pipe (air intake passage)
10 blow-by gas passage
15 ice clump
20 turbocharger
22 compressor impeller
22a vane of compressor impeller
30 capture member
31 circular hole
32 annular portion

The invention claimed is:

1. An air intake structure for an internal combustion engine, the air intake structure comprising:
   a compressor impeller of a turbo supercharger provided in an air intake passage of the internal combustion engine;
   a blow-by gas passage being coupled to the air intake passage on a downstream side with respect to all air filters included in an air cleaner, the blow-by gas passage being configured to introduce a blow-by gas from a crankcase of the internal combustion engine; and
   a capture member provided on a downstream side with respect to the blow-by gas passage and provided on an upstream side with respect to the compressor impeller in the air intake passage to capture an ice clump formed at an inner wall surface of the air intake passage when the ice clump peels off, wherein,
   the capture member is configured as a filter constituted by a meshed member to prevent the ice clump from passing through, and is disposed in the air intake passage so that air is constantly in a state of being allowed to flow within the air intake passage, from an upstream side to a downstream side of the capture member in the air intake passage and enter the compressor impeller without passing through the meshed member, wherein
   the capture member is disposed in a region where the air intake passage has a linear shape and is disposed laterally, such that an intake airflow direction is a horizontal direction, the capture member being disposed only at a lower one-third region in a vertical direction in the air intake passage so that air within the air intake passage passes by the capture member without passing through the meshed member before entering the compressor impeller.

2. The air intake structure for the internal combustion engine according to claim 1, wherein
   the capture member is made of resin material.

3. An air intake structure for an internal combustion engine, the air intake structure comprising:
   a compressor impeller of a turbo supercharger provided in an air intake passage of the internal combustion engine;
   a blow-by gas passage being coupled to the air intake passage on a downstream side with respect to all air filters included in an air cleaner, the blow-by gas passage being configured to introduce a blow-by gas from a crankcase of the internal combustion engine; and
   a capture member provided on a downstream side with respect to the blow-by gas passage and provided on an upstream side with respect to the compressor impeller in the air intake passage to capture an ice clump formed at an inner wall surface of the air intake passage when the ice clump peels off, wherein,
   the capture member is configured as a filter constituted by a meshed member to prevent the ice clump from passing through, and is disposed in the air intake passage so that air is constantly in a state of being allowed to pass by the meshed member without passing through the meshed member, wherein
   the capture member is provided so as to extend radially inward from the inner wall surface of the air intake passage, wherein
   the capture member is an annular member including a central hole corresponding with a center axis of the air intake passage so as to allow the air to pass along the air intake passage from an upstream side of the capture member, through the hole of the capture member, and to a downstream side of the capture member and enter the compressor impeller without passing through the meshed member.

4. The air intake structure for the internal combustion engine according to claim 3, wherein
   the hole includes a peripheral edge that projects toward the upstream side in an intake airflow direction.

5. The air intake structure for the internal combustion engine according to claim 3, wherein
   the capture member has a diaphragm-shaped outline in which a peripheral edge of the center hole the capture member gradually projects toward the upstream side of the air intake passage.

6. An air intake structure for an internal combustion engine, the air intake structure comprising:
   a compressor impeller of a turbo supercharger provided in an air intake passage of the internal combustion engine;
   a blow-by gas passage being coupled to the air intake passage on a downstream side with respect to all air filters included in an air cleaner, the blow-by gas passage being configured to introduce a blow-by gas from a crankcase of the internal combustion engine; and a capture member provided on a downstream side with respect to the blow-by gas passage and provided on an upstream side with respect to the compressor impeller in the air intake passage to capture an ice clump formed at an inner wall surface of the air intake passage when the ice clump peels off, wherein, the capture member is configured as a filter constituted by a meshed member to prevent the ice clump from passing through, and is disposed in the air intake passage so that air is constantly in a state of being allowed to pass from an upstream side of the meshed member to a downstream side of the meshed member in the air intake passage and enter the compressor impeller without passing through the meshed member, wherein the capture member is disposed in a region where the air intake passage has a linear shape and is disposed laterally, such that an intake airflow direction is a horizontal direction, the capture member being disposed only at a lower half region in a vertical direction in the air intake passage so that air passes though an upper half region in the vertical direction of the air intake passage without passing through the capture member before reaching the compressor impeller.

* * * * *